United States Patent [19]
Ishihara et al.

[11] Patent Number: 5,458,003
[45] Date of Patent: Oct. 17, 1995

[54] ELECTROMAGNETIC FLOW METER

[75] Inventors: Tamio Ishihara; Yutaka Sakurai; Masao Fukunaga; Shigeo Nishino; Souzo Fujimoto, all of Katsuta, Japan

[73] Assignees: Hitachi, Ltd., Tokyo; Hitachi Instrument Engineering Co, Ltd., Ibaraki, both of Japan

[21] Appl. No.: 983,060

[22] Filed: Nov. 30, 1992

[30] Foreign Application Priority Data

Nov. 29, 1991 [JP] Japan .................................. 3-316000
Mar. 26, 1992 [JP] Japan .................................. 4-068068

[51] Int. Cl.⁶ ............................................ G01F 1/58
[52] U.S. Cl. ............................ 73/861.12; 73/861.08
[58] Field of Search ................... 73/861.11, 861.12, 73/861.08

[56] References Cited

U.S. PATENT DOCUMENTS

| | | | |
|---|---|---|---|
| 3,610,040 | 10/1971 | Wada | 73/861.12 |
| 3,635,082 | 1/1972 | Prellwitz et al. | 73/861.06 X |
| 4,604,905 | 8/1986 | Rademacher-Dubbick | 73/861.12 |
| 4,625,564 | 12/1986 | Murakami et al. | 73/861.24 |
| 4,635,486 | 1/1987 | Jacobsen et al. | 73/861.12 |
| 4,641,536 | 2/1987 | Jacobsen et al. | 73/861.12 |
| 4,914,950 | 4/1990 | Uematsu et al. | 73/861.12 |
| 5,020,381 | 6/1991 | Bartlett | 73/862.471 |
| 5,307,687 | 5/1994 | Arai et al. | 73/861.12 |

FOREIGN PATENT DOCUMENTS

| | | |
|---|---|---|
| 3423921 | 1/1986 | Germany . |
| 3835972 | 5/1989 | Germany . |
| 3105215 | 5/1991 | Japan . |

*Primary Examiner*—Richard Chilcot
*Assistant Examiner*—Elizabeth L. Dougherty
*Attorney, Agent, or Firm*—Antonelli, Terry, Stout & Kraus

[57] ABSTRACT

An electromagnetic flow meter comprises a ceramic measuring pipe formed into a straight cylinder through which fluid to be measured flows, electromagnetic field generating device disposed adjacent to a central portion of an outer surface of the central portion of the ceramic measuring pipe for generating an electromagnetic field into a radial direction of the ceramic measuring pipe, electrodes for detecting an electric potential generated in the fluid, a case which accommodates the ceramic measuring pipe, the electromagnetic field generating device and the electrodes, and sealing members which are disposed between inner surfaces of the flanges of the case and ends of outer circumference of the ceramic measuring pipe. The case has a length longer than that of the ceramic measuring pipe and flanges at both ends thereof. Inner diameters of the flanges are slightly larger than an outer diameter of the ceramic measuring pipe. Portions of the sealing members outwardly project over the end surfaces of the flanges of the case.

18 Claims, 4 Drawing Sheets

ELECTROMAGNETIC FLOW METER

BACKGROUND OF THE INVENTION

The present invention relates to an electromagnetic flow meter, and, more particularly, to an electromagnetic flow meter of a type having a ceramic measuring pipe capable of satisfactorily measuring the flow rate of a hot fluid, a corrosive fluid or an abrasive fluid or the like.

The electromagnetic flow meter is based on the principle that the flow rate can be measured by detecting the electric potential, which is generated when a conductive fluid to be measured flows perpendicular to the magnetic field, and which is in proportion to the product of the intensity of the applied magnetic field and the flow rate of the fluid, the detection being performed by a pair of electrodes. The measuring pipe of the flow meter, which comes into contact with the fluid to be measured, has a rubber or an ethylene fluoride resin lining on the inner surface thereof in order to have corrosion resistance and to achieve an electrical insulation. In particular, electromagnetic flow meters of a type having a ceramic measuring pipe have been produced recently in order to improve the heat resistance and the wear resistance.

FIG. 1 illustrates the structure of a conventional ceramic electromagnetic flow meter. Referring to FIG. 1, reference numeral 1 represents a ceramic measuring pipe through which a fluid to be measured flows. The measuring pipe 1 has a pair of electrodes 4 facing each other in the radial direction thereof in such a manner that their leading portions project into the inside portion of the measuring pipe 1. The measuring pipe 1 has thick flange portions at the two end portions thereof so as to be secured to a case member 7 by an organic or inorganic adhesive at the outer circumferential surface portions of the flange portions. Electromagnetic coils 2a, 2b and cores 3 are disposed adjacent to the outer surface of the central portion of the measuring pipe 1, the electromagnetic coils 2a, 2b and the cores 3 acting to generate a magnetic field which penetrates the measuring pipe 1. When a fluid flowing in the measuring pipe 1 traverses the aforesaid magnetic field, an electric potential is generated in the fluid. The electric potential thus generated is detected by the pair of the electrodes 4. A wire ejection portion 9 is formed in the central portion of the case member 7 so that wires for exciting the electromagnetic coils 2a and 2b and wires, through which detection signals supplied from the electrodes 4, are connected to outer terminal portions.

The electromagnetic flow meter is clamped and fastened by bolts 12 and nuts 13 while interposing earth rings 5a and 5b and gaskets 10a and 10b disposed on the two sides of the earth rings 5a and 5b in a state where the electromagnetic flow meter is held between a pair of piping flanges 11a and 11b. The earth rings 5a and 5b are in contact with the fluid and are connected to an earth line of the electromagnetic flow meter so that an initial electric potential of the fluid and the earth potential of the electromagnetic flow meter are made to be the same. The gaskets 10a and 10b, in terms of fluid, seals the portions between the process piping flanges 11a, 11b and earth rings 5a, 5b and the portions between the earth rings 5a, 5b and the ceramic measuring pipe 1 of the electromagnetic flow meter.

However, the conventional electromagnetic flow meter encounters the following problems.

When the electromagnetic flow meter is mounted to the process piping, each of the bolts is fastened at a tightening torque of thousands N.cm so as to apply compressive force to each gasket in the axial direction (in the direction of the thickness) in order to obtain fluidtight performance. Since the aforesaid fastening or clamping force is received by the surface of each flange of the ceramic measuring pipe, the surface of the flange is applied with a large plane pressure of tens Mpa to hundreds Mpa.

The plane pressure thus applied generates compressive stress (FIG. 2) in the cylindrical portion of the ceramic measuring pipe in the axial direction and bending moments acting on the flanges. The bending moments result an axial tensile stress and a circumferential tensile stress.

In general, ceramics have the tensile strength about one-tenth of the compressive strength. Therefore, the aforesaid tensile stresses are the largest cause for the breakage of the ceramic measuring pipe. In actual practice, the ceramic measuring pipe is usually broken at positions shown in FIG. 3.

Therefore, an upper limit of the tightening torque for the bolt at the time of fastening the electromagnetic flow meter structured as shown in FIG. 1 to the process piping is usually specified. If the bolt is fastened with a tightening torque larger than the specified torque, the ceramic measuring pipe can be broken. Even if the bolts are fastened with a tightening torque smaller than the specified torque, a so-called "unevenly fastened state", in which only either of the bolts is tightly clamped, will generate excessive tensile stress, causing the ceramic measuring pipe to be broken.

Further, the gasket 10b held between the flange of the ceramic measuring pipe and the earth ring deforms outwardly due to the clamping force applied thereto, that is, a so-called "cold flow" takes place. As a result, another problem arises in that the pressure applied to the gasket is undesirably reduced and therefore the degree of the fluidtight sealing deteriorates.

Another problem arises in that excessively large thermal stress is generated in the flange portion of the ceramic measuring pipe if the temperature of the fluid, which flows in the ceramic measuring pipe, has been rapidly changed because the flange portion has a large thickness. It also leads to a fact that the ceramic measuring pipe is broken.

Accordingly, an object of the present invention is to provide an electromagnetic flow meter, which can be fastened to process piping while preventing generation of excessively large tensile stress in a ceramic measuring pipe thereof, and in which deterioration of fluidtight sealing performance due to cold flow of gaskets interposed between flanges of the ceramic measuring pipe and earth rings can be prevented.

Another object of the present invention is to provide an electromagnetic flow meter, which can be fastened to process piping while preventing generation of excessively large tensile stress in a ceramic measuring pipe thereof, in which deterioration of fluidtight sealing performance due to cold flow of gaskets interposed between flanges of the ceramic measuring pipe and earth rings can be prevented, and in which generation of excessively large thermal stress can be prevented even if temperature of the fluid has been changed rapidly.

SUMMARY OF THE INVENTION

An earth ring for an electromagnetic flow meter according to the present invention has a stepped portion in which a portion of a gasket is fit, the gasket having an outer diameter which is substantially the same as an outer diameter of a barrel of a ceramic measuring pipe of the electromagnetic flow meter.

When an electromagnetic flow meter is fastened to a process piping by using the earth rings according to the present invention, the clamping load acts, as an axial directional compressive force, on only the body of the ceramic measuring pipe and no load acts on outer portions of the flange portions of the ceramic measuring pipe. Hence, no bending moments act on the flanges, so that the breakage of the ceramic measuring pipe experienced with the conventional technology can be prevented. Furthermore, the arrangement in such that the outer periphery of each of the gaskets is restricted by the stepped portion of the earth ring prevents the gaskets from being outwardly deformed. Therefore, satisfactory fluidtight sealing performance can be maintained. If the gasket is deformed outwardly, a bending moment generated due to the clamping force acts on the outer portions of the flanges of the ceramic measuring pipe to cause the ceramic measuring pipe to be broken. However, the arrangement according to the present invention is made in such a manner that the outward deformation of the gasket is prevented as described above and prevents the aforesaid problem of the breakage. Furthermore, a conventional electromagnetic flow meter can be adapted to the present invention while eliminating a necessity of changing the design.

The earth ring may comprise a first noble metal disc portion which comes into contact with fluid which flows in the ceramic measuring pipe and a second metal disc portion into which the gasket is fit.

As a result of the structure thus made, another effect can be obtained in that the manufacturing cost of the earth ring can be reduced.

An embodiment of an electromagnetic flow meter according to the present invention comprises: a ceramic measuring pipe through which fluid to be measured flows; electromagnetic field generating means disposed adjacent to a central portion of an outer surface of the ceramic measuring pipe for generating an electromagnetic field into a radial direction of the ceramic measuring pipe; electrodes for detecting an electric potential generated in the fluid; a case which accommodates the ceramic measuring pipe, the electromagnetic field generating means and the electrodes; earth rings for making an initial electric potential of the fluid to be an earth potential; and sealing members which are interposed between the earth rings and the extremity surfaces of the ceramic measuring pipe, each of which has an outer diameter substantially the same as an outer diameter of the ceramic measuring pipe and a thickness which causes gaps to be left between the earth rings and the ceramic measuring pipe when the sealing members are interposed between the earth rings and the end surfaces of the ceramic measuring pipe, wherein at least one of the earth ring and the ceramic measuring pipe has a stepped portion into which a portion of outer periphery of the sealing member is fit.

When the electromagnetic flow meter according to the present invention is fastened to the process piping, the load due to the clamping acts, as an axial compressive force, on only the body of the ceramic measuring pipe and no load acts on outer portions of the flange portions of the ceramic measuring pipe. Hence, the breakage of the ceramic measuring pipe experienced with the conventional technology can be prevented. Furthermore, as the outer periphey of each sealing member is restricted by the stepped portion of the earth ring and/or the ceramic measuring pipe, the sealing members are prevented from being outwardly deformed. Therefore, satisfactory fluidtight sealing performance can be maintained. Furthermore, as the outward deformation of the sealing members is prevented similarly to the aforesaid embodiment, no bending moment is applied to the flange of the ceramic measuring pipe.

Another embodiment of an electromagnetic flow meter according to the present invention comprises: a ceramic measuring pipe formed into a straight cylinder through which fluid to be measured flows; electromagnetic field generating means disposed adjacent to a central portion of an outer surface of the ceramic measuring pipe for generating an electromagnetic field into a radial direction of the ceramic measuring pipe; electrodes for detecting an electric potential generated in the fluid; a case which accommodates the ceramic measuring pipe, the electromagnetic field generating means and the electrodes, the case having a length longer than that of the ceramic measuring pipe and flanges at both ends thereof of which inner diameters are slightly larger than an outer diameter of the ceramic measuring pipe, and sealing members which are disposed between inner surfaces of the flanges of the case and ends of an outer circumference of the ceramic measuring pipe, and portions of which outwardly project over the end surfaces of the flanges of the case.

In the embodiment, the straight cylindrical ceramic measuring pipe can be freed from breakage because the clamping force for fastening the electromagnetic flow meter is applied to only the case and no load is applied to the straight cylindrical ceramic measuring pipe.

Furthermore, the ceramic measuring pipe can be freed from the generation of the thermal stress due to the change of the thermal change of the fluid because the straight cylindrical ceramic measuring pipe is supported by sealing members in such a manner that it can be displaced in the radial and axial directions, that is, it is floatingly supported. In addition, the generation of the thermal stress can be prevented from another reason that the ceramic measuring pipe is formed into a straight cylinder having no thick portion.

Although the case is longer than the ceramic measuring pipe, it cannot be corroded because it is sealed from the fluid by means of the sealing members.

BRIEF DESCRIPTION OF THE DRAWINGS

FIG. 7 is an axial cross sectional view of another embodiment of the electromagnetic flow meter according to the

DESCRIPTION OF THE PREFERRED EMBODIMENTS

Figure 4:
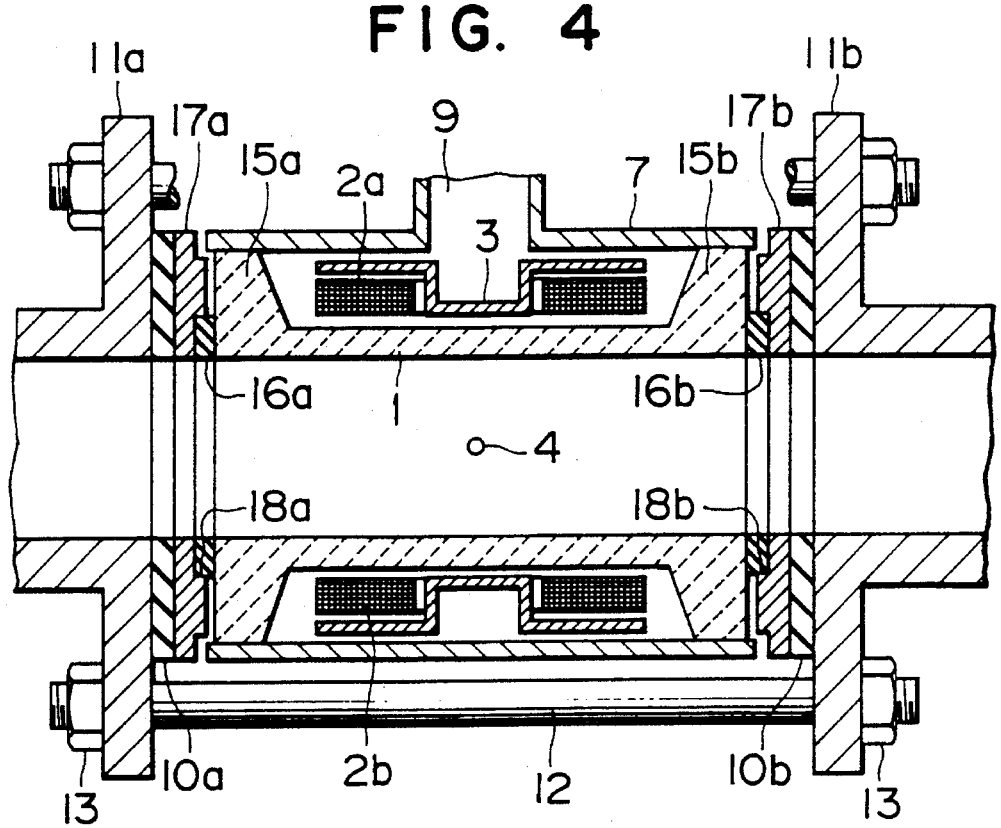
FIG. 4 is an axial cross-sectional view of an electromagnetic flow meter according to the present invention having earth rings.

FIG. 4 is a cross sectional view which illustrates an electromagnetic flow meter according to the present invention. A body of the electromagnetic flow meter is the same as that of the conventional electromagnetic flow meter shown in FIG. 1, and the common elements are given the same reference numerals. Reference numeral 1 represents a ceramic measuring pipe molded from ceramic raw material and arranged to allow fluid to be measured to flow. A pair of electromagnetic coils 2a and 2b are mounted adjacent to a central portion of an outer surface of the ceramic measuring pipe 1. Furthermore, cores 3 are disposed outside of the electromagnetic coils 2a and 2b so as to surround the electromagnetic coils 2a and 2b. The electromagnetic coils 2a, 2b and the cores 3 generate an electromagnetic field which vertically traverses the ceramic measuring pipe 1. In general, the electromagnetic coils 2a and 2b are excited by a direct current which is formed into rectangular waves and which is repeatedly turned on/off or an alternating current. Furthermore, a pair of electrodes 4 are disposed in the central portion of the ceramic measuring pipe 1. The pair of electrodes 4 are mounted in a direction perpendicular to the direction of the electromagnetic field and a direction of the flow of the fluid. An electric potential generated in the fluid can be detected by means of the electrodes 4. Thick flange portions 15a and 15b are formed at both ends of the ceramic measuring pipe 1.

One of the flange portions 15a and 15b is firmly secured to an inner surface of a cylindrical portion of a casing member 7 by bonding, or shrinkage fitting or the like, while the residual flange portion is held by, for example, sticking with a silicon adhesive in such a manner that it can be displaced in the axial direction. If necessary, both flange portions may be displaceably held in the axial direction. The casing member 7 has an opening 9 formed at a central portion of the cylindrical portion thereof. The opening 9 is used to connect wires through which electric currents are supplied to the electromagnetic coils 2a and 2b and signals transmitted from the electrodes 4 are supplied to an external amplifier portion. On the other hand, the flange portions 15a and 15b are coaxially positioned on and in contact with gaskets 16a and 16b each having an outer diameter sufficiently smaller than an outer diameter of each of the flanges portions 15a and 15b. It is ideal that the aforesaid outer diameter be the same as an outer diameter of the body of the ceramic pipe. The gaskets 16a and 16b are inserted into stepped portions (groove portions) 18a and 18b of earth rings 17a and 17b which come into contact with the fluid in order to make an initial electric potential of the fluid to be measured to be the same as an earth electric potential. The depth of the stepped portion is made to be smaller than the thickness of each of the gaskets 16a and 16b so that the earth rings 17a and 17b do not directly come into contact with the ceramic measuring pipe 1. Furthermore, the earth rings 17a and 17b are fastened to the casing member 7 by means of threads in such a manner that the separation of the earth rings 17a and 17b can be prevented.

The electromagnetic flow meter is held between flanges 11a and 11b of the process piping while interposing gasket members 10a and 10b between the electromagnetic flow meter and the earth rings 17a and 17b. The electromagnetic flow meter is clamped by bolts 12 and nuts 13 so as to be, in terms of fluid, hermetically secured to the process piping.

Then, the description will be made about the action of force generated in the electromagnetic flow meter structured as described above when the electromagnetic flow meter is fastened to the process piping by bolts 12 and nuts 13. The compressive force applied to the earth rings 17a, 17b via the flanges 11a, 11b and the gasket members 10a, 10b when the bolts 12 and nuts 13 are tightened is then applied to both extremity surfaces of the ceramic measuring pipe 1 via the gaskets 16a and 16b, causing axial directional compressive force to act on the ceramic measuring pipe. At this time, no clamping force is transmitted to the outer portions of the side surfaces of the flange portions 15a and 15b of the ceramic measuring pipe 1 because the gaskets 16a and 16b do not come into contact with the outer portions of the side surfaces. Therefore, no moment to bend the flange portions 15a and 15b, is generated. Hence, in the ceramic measuring pipe 1, there is no portion where excessively large tensile stress results and only compressive stress acts thereto, so that the breakage can be prevented.

Furthermore, the gaskets 16a and 16b and the ceramic measuring pipe 1 can be accurately disposed on the same axis, and the outward deformation of the gaskets 16a and 16b which takes place due to the application of the clamping force can be prevented because the gaskets 16a and 16b are received in the stepped portions 18a and 18b of the earth rings 17a and 17b. As a result, deterioration of the fluidtight sealing performance which takes place due to cold flow of the gasket can be prevented. Also generation of bending moment in the flanges of the ceramic measuring pipe due to the enlargement deformation of the outer diameter of the gasket can be prevented.

Figure 5:
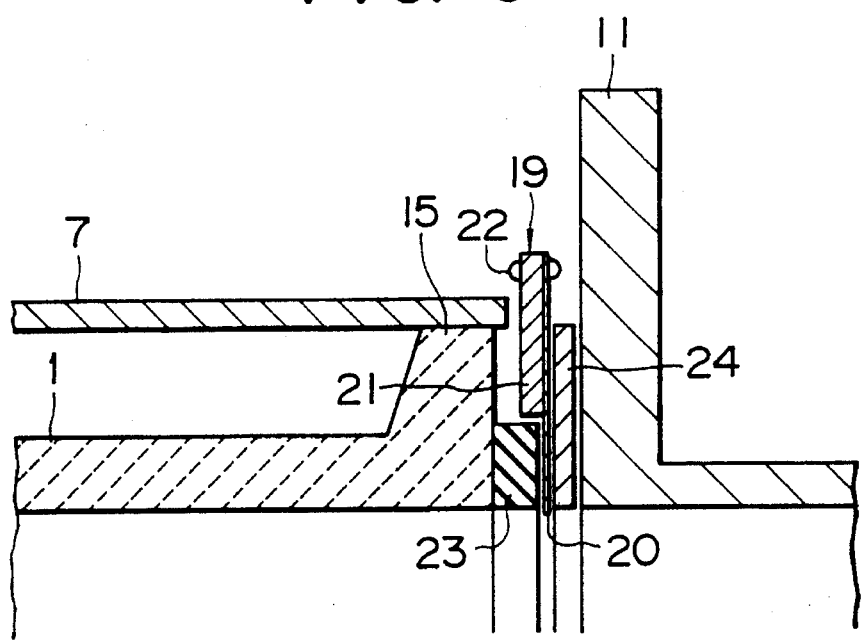
FIG. 5 is a cross-sectional view which illustrates an essential portion of another example of the earth ring of the electromagnetic flow meter according to the present invention.

When the fluid has corrosion influences, the earth rings must be made of noble metal. In such a case, if the whole of the earth ring is made of noble metal as is in the aforesaid embodiment, it becomes very expensive. This is not economical. An earth ring shown in FIG. 5 is one to cope with the aforesaid case.

An earth ring 19 has a first disc portion 20 which comes into contact with the fluid to be measured and a second disc portion 21 in which the gasket 23 is fit. The first disc portion 20 is made of a foil of the noble metal. The second disc portion 21 is made of metal such as stainless steel. The first and the second disc portions 20 and 21 are integrally fastened by a rivet 22 or the like at their outer peripheries.

The structure thus arranged will reduce the cost of the earth ring in addition to the advantages obtainable from the aforesaid embodiment.

Figure 6:
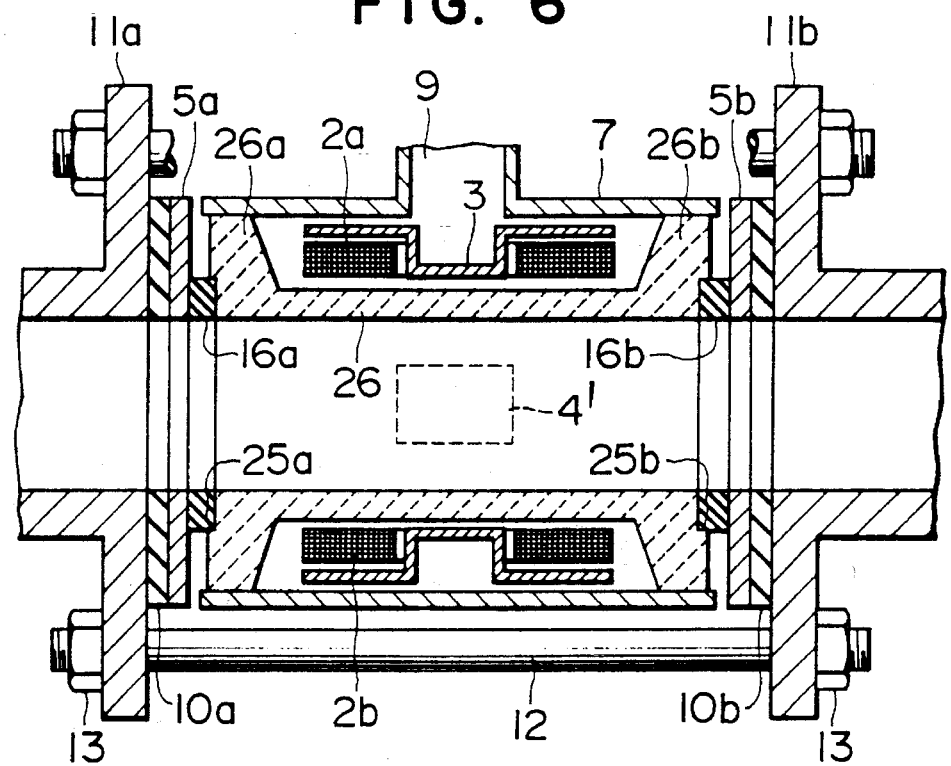
FIG. 6 is an axial cross-sectional view of an embodiment of an electromagnetic flow meter according to the present invention.

A modification of the aforesaid embodiment will now be described with reference to FIG. 6.

The difference from the aforesaid embodiment lies in that electrodes 4' for detecting the electric potential are disposed on an outer surface of a ceramic measuring pipe 26 and that stepped portions, to which portions of the gaskets are fit, are formed at the extremity surfaces of flanges 26a and 26b of the ceramic measuring pipe 26. The electrodes 4' are applied to the outer surface of the ceramic measuring pipe 26 and detect the electric potential generated in the fluid to be measured via an electrostatic capacity created between the fluid to be measured and the electrodes 4'. The flanges 26a and 26b of the ceramic measuring pipe 26 have, at the extremity surfaces thereof, stepped portions 25a and 25b to which portions of the corresponding gaskets 16a and 16b are fit. Each of the gaskets 16a and 16b has a thickness which allows gaps to be formed between the flange 11a of the process piping and the flange 26a of the ceramic measuring pipe 26 and between the flange 11b and the flange 26b when the electromagnetic flow meter is fastened between the flanges 11a and 11b of the process piping.

Also in this embodiment advantages the same as the embodiment shown in FIG. 4 are obtained.

Another embodiment of the electromagnetic flow meter according to the present invention will now be described with reference to FIG. 7.

A ceramic measuring pipe 29 is formed into a straight cylindrical shape and has a thickness of 5 to 10% of an inner diameter thereof. A pair of electromagnetic coils 2a and 2b mounted adjacent to a central portion of an outer surface of the ceramic measuring pipe 29. Furthermore, cores 3 are disposed on outside the electromagnetic coils 2a and 2b so as to surround the electromagnetic coils 2a and 2b. The electromagnetic coils 2a, 2b and the cores 3 generate an electromagnetic field which vertically traverses the ceramic measuring pipe 29. Similarly to the aforesaid embodiment, electrodes 4' for detecting the electric potential of the fluid to be measured are applied to substantially the central portion of the outer surface of the measuring pipe 29.

A case 28 is formed into a substantially straight cylindrical shape having, at both ends thereof, flanges 28a and 28b each having an inner diameter larger than an outer diameter of the ceramic measuring pipe 29. The case 28 has an overall length slightly longer than the ceramic measuring pipe 29. Furthermore, an opening through which wires connected to the electromagnetic coils 2a, 2b and the electrodes 4' are taken out of is formed in the central portion of the case 28.

The ceramic measuring pipe 29 is inserted into the case 28 in such a manner that the ceramic measuring pipe 29 is able to be displaced in the radial direction and the axial direction by a pair of sealing members 27a and 27d disposed at both ends of the outer surface of the ceramic measuring pipe 29. That is, the ceramic measuring pipe 29 is held by the pair of sealing members 27a and 27d in such a manner that the ceramic measuring pipe 29 is floated.

As described above, the pair of sealing members 27a and 27d are interposed between the both ends of the outer surface of the ceramic measuring pipe 28 and the flanges 28a and 28b and further, portions of the pair of sealing members 27a and 27d project outwardly over the end surfaces of the flanges 28a and 28b of the case 28. It is preferable that the sealing members 27a and 27d be "O" rings.

Figure 7:
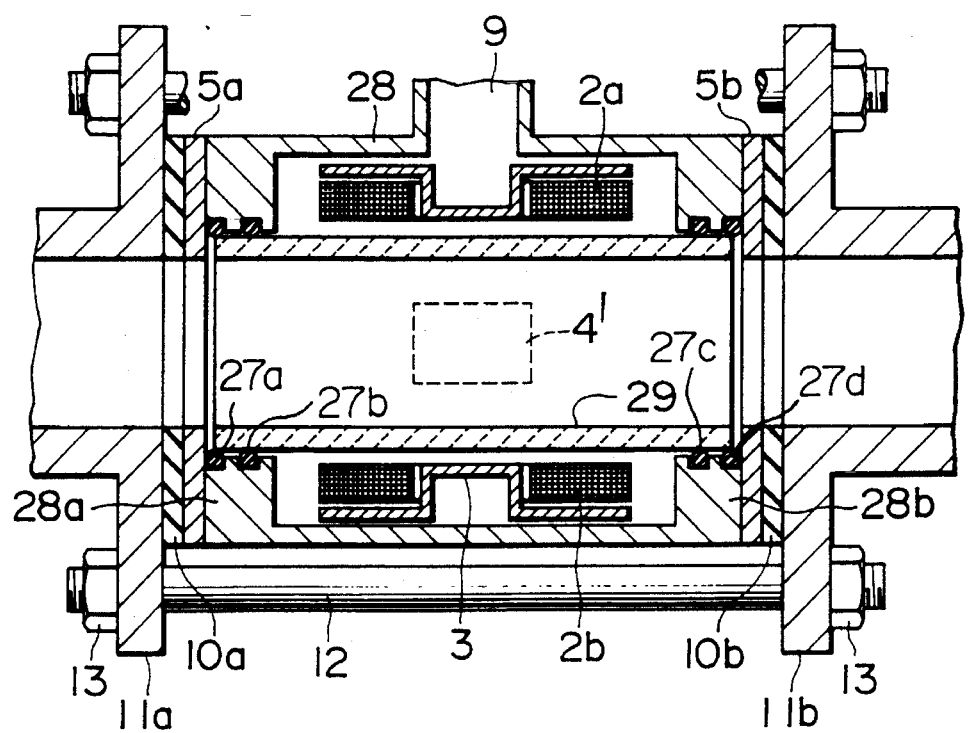

In the embodiment shown in FIG. 7, second sealing members 27b and 27c are disposed between the outer surface of the ceramic measuring pipe 29 and the inner surfaces of the flanges 28a and 28b of the case 28. They may be omitted from the structure because they are ones used in response to needs.

When the electromagnetic flow meter thus structured is fastened to flanges 11a and 11b of the process piping by a plurality of bolts 12 and nuts 13 while interposing earth rings 5a, 5b, gaskets 10a and 10b, the compressive force applied to the earth rings 5a, 5b via the flanges 11a, 11b and the gaskets 10a, 10b compresses the whole of the case 28 in the axial direction. However, the force is not transmitted to the ceramic measuring pipe 29 because gaps are present between the ceramic measuring pipe 29 and the earth rings 5a, 5b. That is, any force applied at the time of fastening the electromagnetic flow meter to the process piping is not applied to the ceramic measuring pipe 29.

If the temperature of the fluid to be measured and flowing in the ceramic measuring pipe 29 is rapidly changed, a difference in the temperature takes place between the outer surface of the ceramic measuring pipe 29 and the inner surface of the same, causing thermal stress to be generated in the ceramic measuring pipe 29. The level of the thermal stress is in proportion to the thickness of the measuring pipe 29 and the degree of the uneven thickness. Since ceramics generally have poor durability against a tensile force in comparison with a compressive force, ceramics can be most easily broken when the inner surface of the ceramic measuring pipe 29 is rapidly cooled. Since in this embodiment, the ceramic measuring pipe 29 is formed into a simple cylinder having a thin wall, generation of the internal thermal stress can be reduced.

Although the difference in the temperature and the linear expansion coefficient between the ceramic measuring pipe 29 and the case 28 ought to cause the dimensions of them to be changed in the axial and radial directions and generate thermal stress between them, only the gap between them is changed but no force is applied to the ceramic measuring pipe 1 because the ceramic measuring pipe 29 is floated in the case 28 via the "O" ring which are soft.

In the case where the earth rings 5a and 5b are not required, another arrangement may be employed in which also the gaskets 10a and 10b are removed and the end surfaces of the flange 28a and 28b are directly brought into contact with the piping flanges 11a and 11b of the process piping.

Even if the fluid to be measured has corrosiveness, a necessity for the material of the case to have specific corrosion resistance can be eliminated, because the case is sealed from the fluid to be measured by means of the "O" rings. Therefore, the case can be made of a general material such as stainless steel. Furthermore, the arrangement according to this embodiment enables simple flat rings to be used as the earth rings and therefore a corrosion resisting electromagnetic flow meter can easily be obtained by making the earth rings of a corrosion resisting noble metal film such as platinum.

Since the sealing members 27a and 27b can be easily removed when they comprise the "O" rings, it is possible to use them by selecting their material in response to the degree of the corrosiveness of the fluid to be measured.

Figure 1:
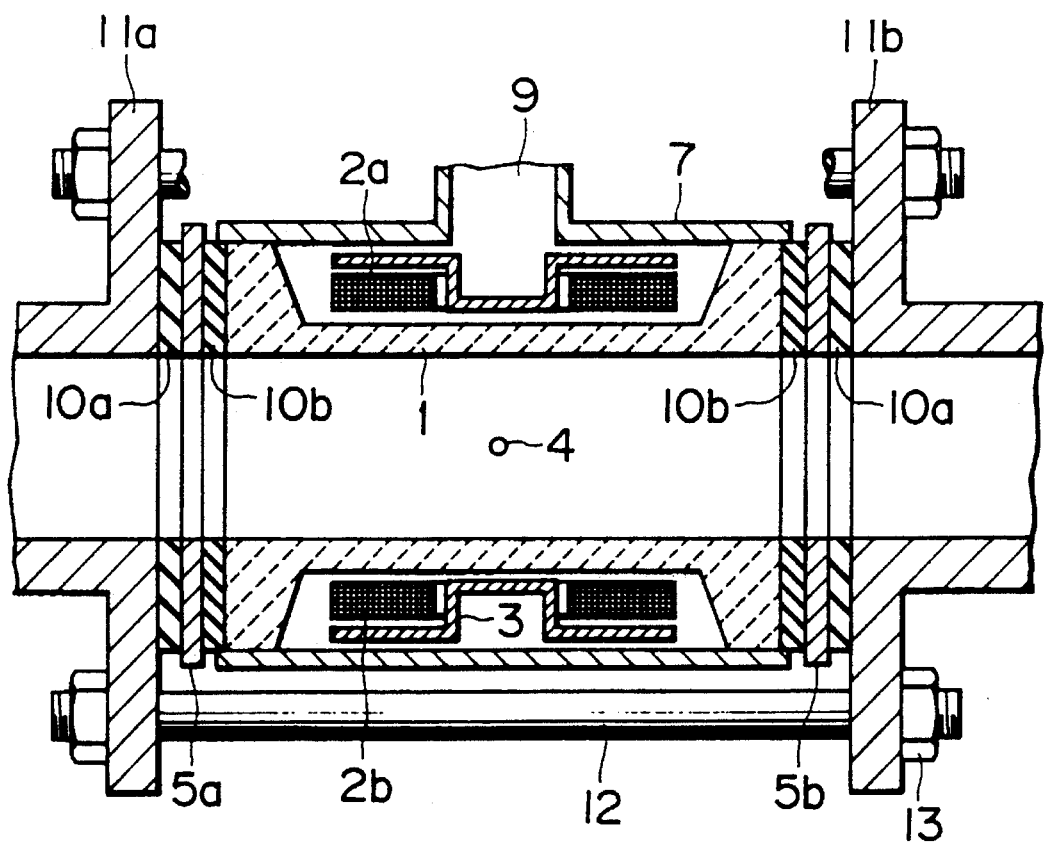
FIG. 1 is an axial cross sectional view of a conventional electromagnetic flow meter.
Figure 2:
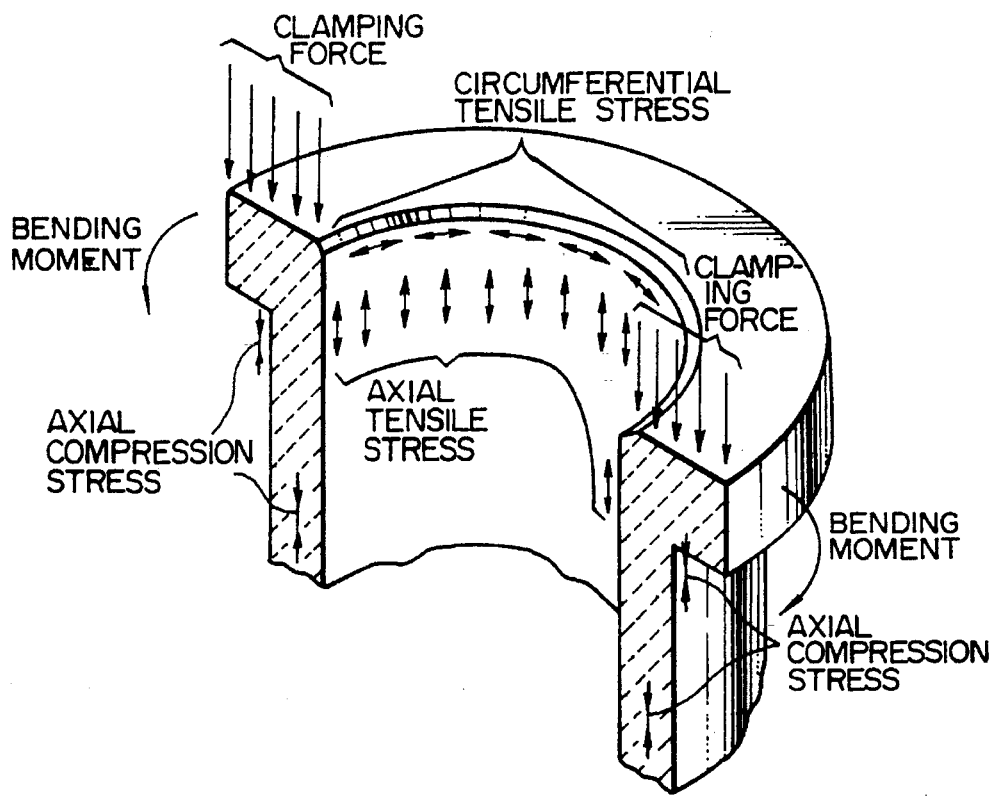
FIG. 2 is a perspective view of an axially sectioned ceramic measuring pipe of the conventional electromagnetic flow meter in which shown is the distribution of stresses generated when the ceramic measuring pipe is fastened to a process piping.
Figure 3:
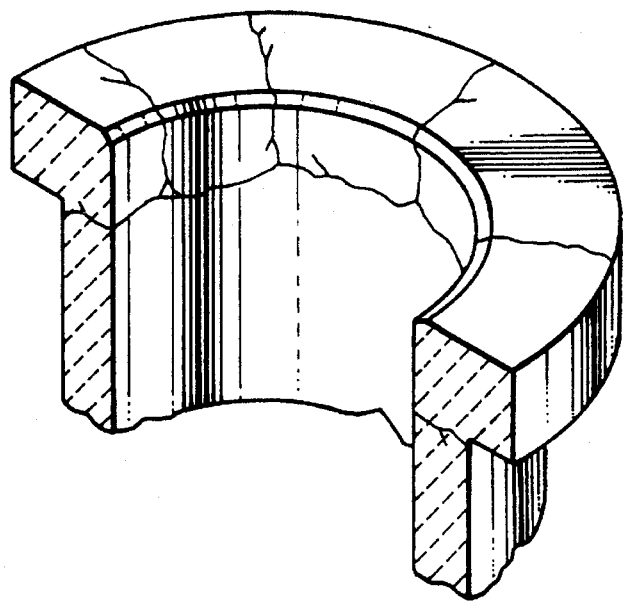
FIG. 3 a perspective view similar to FIG. 2 and showing a state of breakage of the ceramic measuring pipe.

The conventional electromagnetic flow meter shown in FIG. 1 and the electromagnetic flow meters according to the present invention and shown in FIGS. 4 and 7 were subjected to a compressive load test by using a loading test machine. As a result, the ceramic measuring pipe of the conventional electromagnetic flow meter was broken when a compressive load of 9.4 tons was applied, that of the electromagnetic flow meter according to the present invention and shown in FIG. 4 was broken when a compressive load of 32 tons was applied, and that of the electromagnetic flow meter according to the present invention and shown in FIG. 7 was broken when a compressive load of 137 tons was applied. That is, the electromagnetic flow meters according to the present invention respectively have strength of 4.2 times and 137 times the strength of the conventional electromagnetic flow meter.

What is claimed is:

1. An electromagnetic flow meter comprising:

a ceramic measuring pipe having a pipe body portion and a flange portion, said pipe body portion defining a hollow cavity through which fluid to be measured flows;

electromagnetic field generating means disposed adjacent to a central portion of an outer surface of said pipe body portion and for generating an electromagnetic field into a radial direction of said ceramic measuring pipe;

electrodes for detecting an electric potential generated in said fluid;

a case which accommodates said ceramic measuring pipe, said electromagnetic field generating means and said electrodes;

earth rings for making an initial electric potential of said fluid to be an earth potential; and sealing members which are interposed between said earth rings and respective end surfaces of said ceramic measuring pipe, wherein each sealing member has an outer diameter which is substantially the same as an outer diameter of said pipe body portion of said ceramic measuring pipe and which has a predetermined thickness such that when said sealing members are interposed between said earth rings and said respective end surfaces of said ceramic measuring pipe, an axially compressive force is applied to said ceramic measuring pipe substantially only to said pipe body portion, and said flange portion has substantially no axially compressive force applied thereto, and wherein at least one earth ring of said earth rings and said ceramic measuring pipe has a stepped portion in which a portion of an outer periphery of said sealing member is fit.

2. An electromagnetic flow meter according to claim 1, wherein said ceramic measuring pipe is held at at least one end portion thereof displaceably relative to said case in the axial direction thereof.

3. An electromagnetic flow meter according to claim 1, wherein said earth ring has a stepped portion in which a portion of a gasket as said sealing member is fit, said stepped portion having an outer diameter which is substantially the same as the outer diameter of said pipe body portion of said ceramic measuring pipe.

4. An electromagnetic flowmeter as claimed in claim 1, wherein said predetermined thickness of said each sealing member is sufficiently thick such that a gap is left between said earth rings and a majority of each said flange portion.

5. An electromagnetic flowmeter as claimed in claim 1, wherein said ceramic measuring pipe is substantially cylindrical.

6. An electromagnetic flow meter according to claim 1, wherein said earth ring comprises a first noble metal disc portion which comes into contact with fluid flowing in said ceramic measuring pipe and a second metal disc portion in which said gasket is fit, said first and second disc portions being joined together.

7. An electromagnetic flow meter comprising:

a ceramic measuring pipe having a pipe body portion, said pipe body portion defining a hollow cavity through which fluid to be measured flows;

electromagnetic field generating means disposed adjacent to a central portion of an outer surface of said pipe body portion for generating an electromagnetic field into a radial direction of said ceramic measuring pipe;

electrodes for detecting an electric potential generated in the fluid;

a case which accommodates said ceramic measuring pipe, said electromagnetic field generating means and said electrodes, said case having a length longer than that of said ceramic measuring pipe for receiving an axially compressive force applied thereto during a mounting of said electromagnetic flow meter in a working position and substantially preventing said axially compressive force from being applied to said ceramic measuring pipe, said case further having flanges at both ends thereof of which inner diameters are larger than an outer diameter of said ceramic measuring pipe, and sealing members which are disposed between inner surfaces of said flanges of said case and ends of an outer circumference of said ceramic measuring pipe, wherein said ceramic measuring pipe has substantially no axially compressive force applied thereto and at least a portion of said ceramic measuring pipe is normally axially displaceable with respect to said case.

8. An electromagnetic flow meter according to claim 7, further comprising second sealing members disposed between the outer circumference of said ceramic measuring pipe and the inner surfaces of said flanges of said case.

9. An electromagnetic flow meter according to claim 7, wherein said sealing members comprise "O" rings.

10. An electromagnetic flowmeter as claimed in claim 7, wherein each sealing member of said sealing members is only partially disposed between said case and said ceramic measuring tube and is partially disposed beyond an axial length of said ceramic measuring pipe.

11. An electromagnetic flowmeter as claimed in claim 10, wherein said ceramic measuring pipe is substantially straight and has substantially uniform wall thicknesses.

12. An electromagnetic flowmeter as claimed in claim 10, wherein said ceramic measuring tube is substantially cylindrical.

13. An electromagnetic flowmeter as claimed in claim 7, wherein an entire said ceramic measuring pipe is normally axially displaceable with respect to said case.

14. An electromagnetic flowmeter as claimed in claim 7, wherein said ceramic measuring pipe is substantially straight and has substantially uniform wall thicknesses.

15. An electromagnetic flowmeter as claimed in claim 7, wherein said ceramic measuring tube is substantially cylindrical.

16. An electromagnetic flow meter as claimed in claim 7, further comprising earth rings disposed adjacent axial ends of said case, wherein said earth ring comprises a first noble metal disc portion which comes into contact with fluid flowing in said ceramic measuring pipe and a second metal disc portion in which said gasket is fit, said first and second disc portions being joined together.

17. An electromagnetic flow meter comprising:

a ceramic measuring pipe through which fluid to be measured flows;

electromagnetic field generating means disposed adjacent to a central portion of an outer surface of said ceramic measuring pipe and for generating an electromagnetic field into a radial direction of said ceramic measuring pipe;

electrodes for detecting an electric potential generated in said fluid;

a case which accommodates said ceramic measuring pipe, said electromagnetic field generating means and said electrodes;

earth rings for making an initial electric potential of said fluid to be an earth potential; and sealing members which are interposed between said earth rings and both end surfaces of said ceramic measuring pipe, each of which has an outer diameter which is substantially the same as an outer diameter of a barrel portion of said ceramic measuring pipe and which has a thickness which causes gaps to be left between said earth rings and said ceramic measuring pipe when said sealing members are interposed between said earth rings and the both end surfaces of said ceramic measuring pipe;

wherein at least one of said earth ring and said ceramic measuring pipe has a stepped portion in which a portion of an outer periphery of said sealing member is fit; and wherein said earth ring comprises a first noble metal disc portion which comes into contact with fluid flowing in said ceramic measuring pipe and a second metal disc portion in which said gasket is fit, said first and second disc portions being joined together.

18. An electromagnetic flow meter comprising:

a ceramic measuring pipe having a pipe body portion, said pipe body portion defining a cavity through which fluid to be measured flows;

electromagnetic field generating means, disposed on an outer surface of said ceramic measuring pipe, for applying a magnetic field to said fluid;

electrodes for detecting an electric potential generated in said fluid;

a case receiving said ceramic measuring pipe therein and having a flange at each of axial ends thereof and a length longer than that of said ceramic measuring pipe, said flange having an inner diameter larger than that of said ceramic measuring pipe, said case being axially compressively interconnected to process pipes; and seal means for sealing between an inner surface of said flange and an outer surface of said ceramic measuring pipe;

wherein an axial compressive force applied by said process pipes to said electromagnetic flowmeter is substantially not applied to said ceramic measuring pipe.

* * * * *